US008335629B2

(12) United States Patent
Carlsson et al.

(10) Patent No.: US 8,335,629 B2
(45) Date of Patent: Dec. 18, 2012

(54) METHOD FOR CONTROLLING A FUEL VALVE AND/OR AN AIR VALVE FOR AN INTERNAL COMBUSTION ENGINE

(75) Inventors: Bo Carlsson, Alingsås (SE); Mikael Larsson, Jönköping (SE)

(73) Assignee: Husqvarna AB, Huskvarna (SE)

( * ) Notice: Subject to any disclaimer, the term of this patent is extended or adjusted under 35 U.S.C. 154(b) by 1017 days.

(21) Appl. No.: 12/300,620

(22) PCT Filed: May 14, 2007

(86) PCT No.: PCT/SE2007/000463

§ 371 (c)(1),
(2), (4) Date: Jan. 7, 2009

(87) PCT Pub. No.: WO2007/133148

PCT Pub. Date: Nov. 22, 2007

(65) Prior Publication Data

US 2009/0145399 A1 Jun. 11, 2009

(30) Foreign Application Priority Data

May 12, 2006 (WO) ................ PCT/SE2006/000562

(51) Int. Cl.
*B60T 7/12* (2006.01)
*G05D 1/00* (2006.01)
*G06F 7/00* (2006.01)
*G06F 17/00* (2006.01)

(52) U.S. Cl. ......... 701/103; 701/104; 123/437; 123/438

(58) Field of Classification Search ................ 123/73 A, 123/437, 438, 317; 701/103, 104; 261/DIG. 23, 261/DIG. 24
See application file for complete search history.

(56) References Cited

U.S. PATENT DOCUMENTS 4,577,597 A 3/1986 Tomita
4,945,869 A * 8/1990 Klomp ........................ 123/73 V
5,377,631 A * 1/1995 Schechter .................. 123/198 F
5,709,193 A 1/1998 Svensson et al.
5,732,682 A * 3/1998 Petersson ...................... 123/508
6,702,261 B1 * 3/2004 Shaw ............................. 261/35
6,769,394 B2 8/2004 Radel et al.
2007/0034180 A1 * 2/2007 Naegele et al. ............. 123/73 A

FOREIGN PATENT DOCUMENTS

WO 9530828 A1 11/1995

* cited by examiner

*Primary Examiner* — Willis R Wolfe, Jr.
*Assistant Examiner* — Anthony L Bacon
(74) *Attorney, Agent, or Firm* — Novak Druce + Quigg LLP

(57) ABSTRACT

A method for controlling a valve of a crank case scavenged internal combustion engine includes determining a valve control sequence, wherein the valve is controlled in consecutive periods of revolutions each having a period length of at least ten revolutions, and controlling the valve according to the valve control sequence to adjust the ratio of fuel to air in a combustible mixture delivered to an engine combustion chamber. Determining the valve control sequence for each period includes providing a number of valve shut-off positions, wherein the number of valve shut-off positions corresponds to an amount of fuel or air to be supplied to the engine during the corresponding period, and determining which revolutions of the period that the valve is to be closed.

16 Claims, 5 Drawing Sheets

SHUT-OFF SCHEDULE FOR A 32-PERIOD SYSTEM

| FUEL CONTROL SEQUENCE. [$N_S$/PL] | 16/32 | 15/32 | 14/32 | 13/32 | 12/32 | 11/32 | 10/32 | 9/32 | 8/32 | 7/32 | 6/32 | 5/32 | 4/32 | 3/32 | 2/32 | 1/32 | 0/32 |
|---|---|---|---|---|---|---|---|---|---|---|---|---|---|---|---|---|---|
| FUEL REDUCTION | 50% | 47% | 44% | 41% | 38% | 34% | 31% | 28% | 25% | 22% | 19% | 16% | 13% | 9% | 6% | 3% | 0% |
| FUEL SHUT-OFF POSITIONS | | | | | | | | | | | | | | | | | |
| **FC1** | 1 | 1 | 1 | 1 | 1 | 1 | 1 | 1 | 1 | 1 | 1 | 1 | 1 | 1 | 1 | 1 | |
| **FC2** | 3 | 3 | 3 | 3 | 4 | 4 | 4 | 5 | 5 | 6 | 6 | 7 | 9 | 12 | 17 | | |
| **FC3** | 5 | 5 | 6 | 6 | 6 | 7 | 7 | 8 | 9 | 10 | 12 | 14 | 17 | 22 | | | |
| **FC4** | 7 | 7 | 8 | 8 | 9 | 10 | 11 | 12 | 13 | 15 | 17 | 20 | 25 | | | | |
| **FC5** | 9 | 10 | 10 | 11 | 12 | 13 | 14 | 15 | 17 | 19 | 22 | 27 | | | | | |
| **FC6** | 11 | 12 | 12 | 13 | 14 | 16 | 17 | 19 | 21 | 24 | 28 | | | | | | |
| **FC7** | 13 | 14 | 15 | 16 | 17 | 18 | 20 | 22 | 25 | 28 | | | | | | | |
| **FC8** | 15 | 16 | 17 | 18 | 20 | 21 | 23 | 26 | 29 | | | | | | | | |
| **FC9** | 17 | 18 | 19 | 21 | 22 | 24 | 27 | 29 | | | | | | | | | |
| **FC10** | 19 | 20 | 22 | 23 | 25 | 27 | 30 | | | | | | | | | | |
| **FC11** | 21 | 22 | 24 | 26 | 28 | 30 | | | | | | | | | | | |
| **FC12** | 23 | 24 | 26 | 28 | 30 | | | | | | | | | | | | |
| **FC13** | 25 | 27 | 28 | 31 | | | | | | | | | | | | | |
| **FC14** | 27 | 29 | 31 | | | | | | | | | | | | | | |
| **FC15** | 29 | 31 | | | | | | | | | | | | | | | |
| **FC16** | 31 | | | | | | | | | | | | | | | | |

Fig. 2a
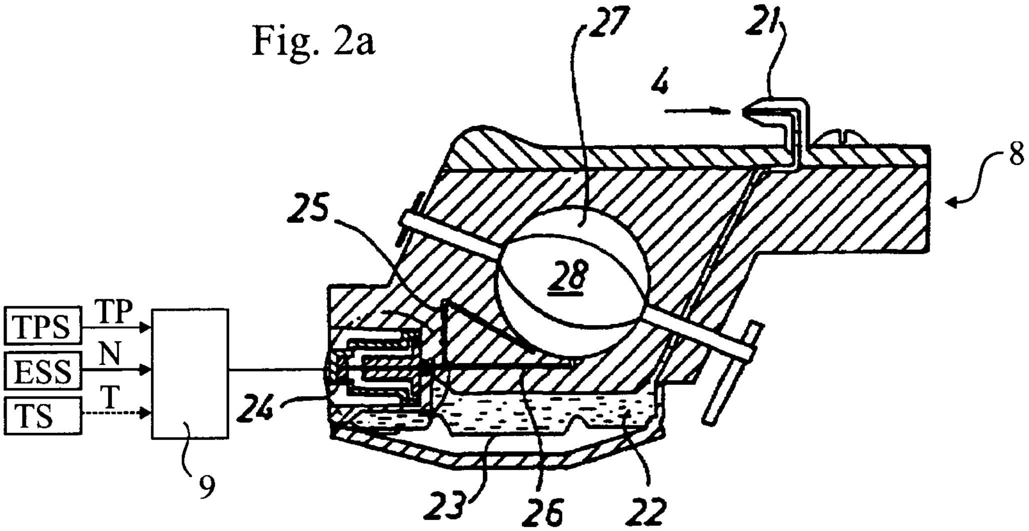
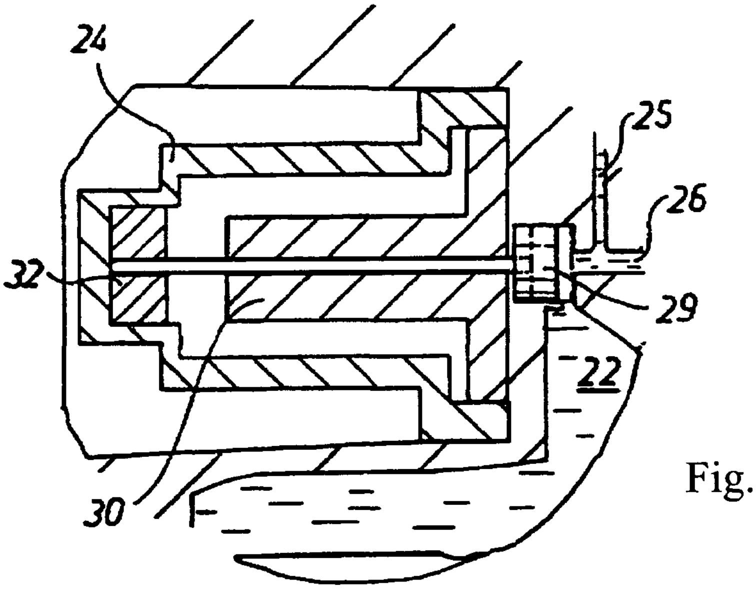
Fig. 2b

Fig. 3

SHUT-OFF SCHEDULE FOR A 32-PERIOD SYSTEM

| | FUEL CONTROL SEQUENCE. [$N_S$/PL] | 16/32 | 15/32 | 14/32 | 13/32 | 12/32 | 11/32 | 10/32 | 9/32 | 8/32 | 7/32 | 6/32 | 5/32 | 4/32 | 3/32 | 2/32 | 1/32 | 0/32 |
|---|---|---|---|---|---|---|---|---|---|---|---|---|---|---|---|---|---|---|
| | FUEL REDUCTION | 50% | 47% | 44% | 41% | 38% | 34% | 31% | 28% | 25% | 22% | 19% | 16% | 13% | 9% | 6% | 3% | 0% |
| FUEL SHUT-OFF POSITIONS | **FC1** | 1 | 1 | 1 | 1 | 1 | 1 | 1 | 1 | 1 | 1 | 1 | 1 | 1 | 1 | 1 | 1 | |
| | **FC2** | 3 | 3 | 3 | 3 | 4 | 4 | 4 | 5 | 5 | 6 | 6 | 7 | 9 | 12 | 17 | | |
| | **FC3** | 5 | 5 | 6 | 6 | 6 | 7 | 7 | 8 | 9 | 10 | 12 | 14 | 17 | 22 | | | |
| | **FC4** | 7 | 7 | 8 | 8 | 9 | 10 | 11 | 12 | 13 | 15 | 17 | 20 | 25 | | | | |
| | **FC5** | 9 | 10 | 10 | 11 | 12 | 13 | 14 | 15 | 17 | 19 | 22 | 27 | | | | | |
| | **FC6** | 11 | 12 | 12 | 13 | 14 | 16 | 17 | 19 | 21 | 24 | 28 | | | | | | |
| | **FC7** | 13 | 14 | 15 | 16 | 17 | 18 | 20 | 22 | 25 | 28 | | | | | | | |
| | **FC8** | 15 | 16 | 17 | 18 | 20 | 21 | 23 | 26 | 29 | | | | | | | | |
| | **FC9** | 17 | 18 | 19 | 21 | 22 | 24 | 27 | 29 | | | | | | | | | |
| | **FC10** | 19 | 20 | 22 | 23 | 25 | 27 | 30 | | | | | | | | | | |
| | **FC11** | 21 | 22 | 24 | 26 | 28 | 30 | | | | | | | | | | | |
| | **FC12** | 23 | 24 | 26 | 28 | 30 | | | | | | | | | | | | |
| | **FC13** | 25 | 27 | 28 | 31 | | | | | | | | | | | | | |
| | **FC14** | 27 | 29 | 31 | | | | | | | | | | | | | | |
| | **FC15** | 29 | 31 | | | | | | | | | | | | | | | |
| | **FC16** | 31 | | | | | | | | | | | | | | | | |

Example of fuel control sequenses, for a 64-period system

METHOD FOR CONTROLLING A FUEL VALVE AND/OR AN AIR VALVE FOR AN INTERNAL COMBUSTION ENGINE

TECHNICAL FIELD

The present invention relates to a method for controlling a fuel valve and/or an air valve supplying fuel or air respectively to a crank case scavenged internal combustion engine comprising means for controlling said valve used for a supply system for combustible mixture to the engine, such as a carburetor or a fuel-injection system. The invention further concerns a crank case scavenged internal combustion engine controlled by the method and further a fuel supply system for a crank case scavenged internal combustion engine controlled by the method.

BACKGROUND OF THE INVENTION

Internal combustion engines of two-stroke or four-stroke type usually are equipped with a fuel supply system of carburetor type or injection type. In a carburetor, the throttle of the carburetor is affected by the operator's demand, so that wide open throttle produces a minimum throttling in the carburetor barrel. The depression created by the passing air in the carburetor venturi draws fuel into the engine. Traditionally, carburetor engines are equipped with stationary nozzles or manually adjustable nozzles to regulate the degree of richness/leanness of the air-fuel mixture. As the demands on lower fuel consumption jointly with demands on cleaner exhaust have increased also electronically controlled nozzles have been suggested. In the latter case the amount of fuel supplied to the carburetor barrel is adjusted. This is affected with the aid of variable throttling. Increasing throttling gives a leaner air-fuel mixture. The throttling is regulated continuously or in small steps. However, such quantity adjustment is comparatively complicated and expensive. It is already known to provide for a brief shut-off during the suction phase in order to reduce the amount of fuel or, in accordance with the teachings of DE 23 48 63S, to briefly open a normally closed valve during the suction phase. It is very difficult to rapidly open and close a valve, or vice or vice versa, with accuracy. The carburetor is positioned in an intake passage leading to the engine cylinder. This intake passage is opened and closed by the engine piston or by a particular valve, usually called suction valve. Owing to this opening and closing of the intake passage varying flow speeds and pressures generate inside the passage. Since the carburetor is constructed to allow the depression in the carburetor barrel to draw in fuel, also the amount of fuel supplied will be largely affected by the closing and the opening of the intake passage. The basic function of the carburetor is to add an appropriate amount of fuel to a predetermined amount of passing air.

EP 0 799 377 a method characterized primarily in that in the fuel supply system shut-off is effected during a part of the operating cycle by means of a shut-off valve shutting off the entire fuel flow or a part flow, and in that the shut-off is arranged to take place to an essential extent during a part of the operating cycle when the intake passage is closed and consequently the feed of fuel is reduced or has ceased. This means that the amount of fuel supplied can be precision-adjusted by a slight displacement of one of the flanks of the shut-off valve shut-off curve.

However, precision-adjusting the fuel supply by a slight displacement of one of the flanks of the shut-off valve shut-off curve still requires a comparably high accuracy of the shut-off valve. Further a steeper slope of the flank provides for finer the fuel adjustments, i.e. the time for the shut-off valve to change from open to close or vice versa; but a quicker shut-off valve is more expensive.

EP 0 799 377 suggest the shut-offs to be done for each revolution varying the fuel supply by adjusting the displacement of the flank of the shut-off valve; but in particular for crank case scavenged two/four-stroke engines, the shut-offs can be performed every other, every third or possibly every forth engine revolution instead upon each engine revolution, in the case of a four-stroke engine, half as often. In that case a major fuel amount adjustment is made instead, for instance by completely shutting of the fuel supply for a revolution. This can be done since the crank case in crank case scavenged two-stroke engines or crank case scavenged four-stroke engines can hold a considerable amount of fuel and consequently serve as a leveling reservoir, it is therefore not necessary to adjust the fuel supply for each revolution when controlling the fuel supply to the engine, i.e. adjusting the fuel supply in one revolution will affect the subsequent revolutions.

By shutting off the entire fuel supply for a revolution, the requirements of accuracy and speed of the shut-off valve could be much reduced, however, utilizing the method of EP 0 799 377, a very rough regulation would be provided, i.e. for the two-stroke engine the sequences; 1/2, 1/3, 1/4 corresponds to the fuel reductions steps 50%, 33% and 25% and for the four-stroke engine the sequences; 1/2, 1/4, 1/6, 1/8 corresponds to the fuel reductions steps 50%, 25%, 17%, 13%. The difference in fuel reduction between fuel shut-offs every second and every third revolution is as high as 17 percentages units and between fuel shut-offs at every third and every fourth revolution, the difference is still as high as 8 percentages units. These differences could of course be compensated for by varying the displacement of one of the flanks of the shut-off valve shut-off curve, but then the requirements of the shut-off valve increases.

Further, each time the shut-off valve is activated energy is consumed, thus it would be advantageous providing a control method minimizing the number of opening and closings of the shut-off valve, without compromising with the accuracy of the control method.

SUMMARY OF THE INVENTION

The purpose of the subject invention is to considerably reduce the problems outlined above by providing a method for controlling a fuel supply to a crank case scavenged internal combustion engine, in a fuel supply system thereof, such as a carburetor or a fuel-injection system, fuel being supplied to the engine, the fuel supply system comprising means for shutting off fuel supply to the engine, partly or completely, during an engine revolution, where a fuel valve control sequence $N_s/PL$ determines a number of shut-offs $N_s$ for which the fuel supply of the engine will be partly or completely shut-off during a period of revolutions, and where the to the fuel valve control sequence $N_s/PL$ corresponding fuel shut-off positions FCn determines which revolutions the fuel supply of the engine will be partly or completely shut-off during the period of revolutions, the period having a period length PL of at least 10 revolutions. The term crankcase scavenged refers to an engine where at least a part, and preferably all, of the air needed for the combustion in the engine is crankcase scavenged. Preferably at least a part of the fuel and/or lubricant needed for the engine is crankcase scavenged.

In the preferred embodiment the period length of the period is a fixed predetermined value and preferably the period length includes at least 25 revolutions, preferably at least 50 revolutions, even more preferably at least 100 revolutions. Thereby the fuel reduction can be precision-adjusted. E.g. increasing or decreasing the shut-offs by one over hundred provides a fuel reduction of one percentage unit for each shut-off, for one over fifty the doubled.

Further the fuel shut-off positions FCn corresponding to the fuel valve control sequence $N_s$/PL are distributed substantially evenly during the period and the fuel shut-off positions are distributed so that two separate fuel shut-off positions FCn are not adjacent to each other. This provides for a smooth engine run.

According to a further embodiment the period length is variable, which variable period length is based on real time engine settings and performance preferably the engine speed. Preferably the variable period length is chosen from a set of predetermined values, the set comprising at least two different values. For instance the engine could use one period length when the engine is idling and another period length when the engine is operating underload.

Further a crank case scavenged internal combustion engine is provided, the engine controlled by the method of the invention where the fuel supply is partly or completely shut-off according to the fuel shut-off positions. Preferably the engine is a two stroke engine and preferably the fuel supply is completely shut-off during the engine revolution according to the fuel shut-off positions.

Further a fuel supply system for a crank case scavenged internal combustion engine is provided, the fuel supply system controlled by the method of the invention where the fuel supply is partly or completely shut-off according to the fuel shut-off positions. Preferably the engine is a two stroke engine and preferably the fuel supply is completely shut-off during the engine revolution according to the fuel shut-off positions.

According to the preferred embodiment the fuel supply system is a carburetor.

According to a further embodiment the fuel supply system is a fuel injection system.

According to a further embodiment of the present invention an air valve in an internal combustion engine may also be controlled according to the same principles, i.e. by opening and closing the air valve according to an air valve control sequence having corresponding shut-off positions. Of course the engine may comprise a fuel valve and an air valve which both are controlled by the method of the engine, having a fuel valve control sequence and an air valve control sequence respectively.

BRIEF DESCRIPTION OF THE DRAWINGS

The invention will be described in the following in closer details by means of various embodiments thereof with reference to the accompanying drawings wherein identical numeral references have been used in the various drawing figures to denote corresponding components.

FIG. 2*a* illustrates schematically a carburetor intended to be incorporated in a fuel supply system in accordance with the invention.

FIG. 2*b* is in a part enlargement of an area illustrated in FIG. 2*a* by means of dash- and dot lines.

FIG. 3 is a table showing a fuel shut-off schedule for the fuel control of a crankcase scavenged engine 1.

DETAILED DESCRIPTION OF THE INVENTION

Figure 1:
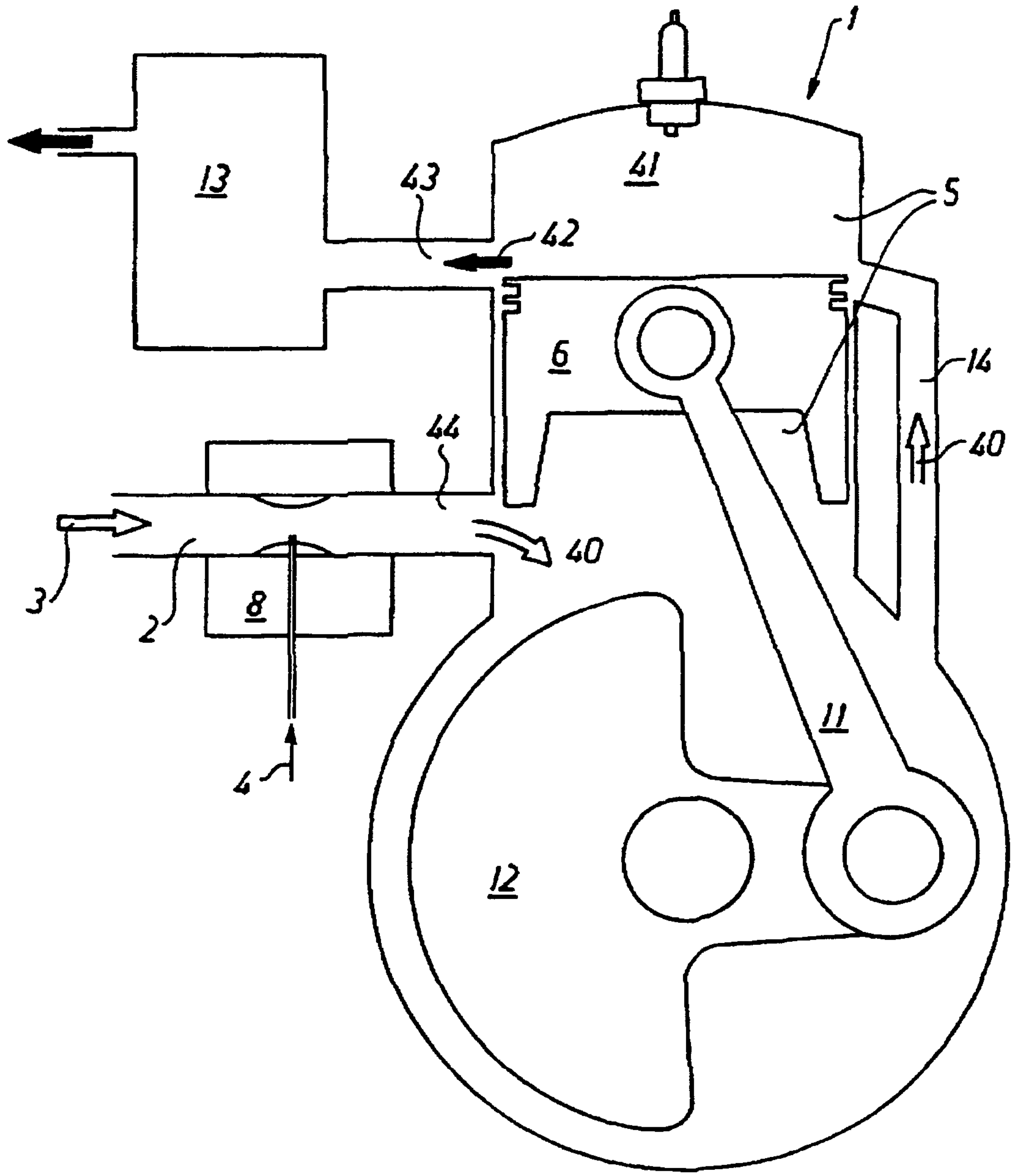
FIG. 1 is a schematically illustration of an internal combustion engine of two-stroke type in which the method and the device according to the invention have been applied.

In the schematically illustrated drawing FIG. 1 numeral reference 1 designates an internal combustion engine of a two-stroke type. It is crank case scavenged, i.e. a mixture 40 of air 3 and fuel 4 from a fuel supply system 8 (e.g. a carburetor or a low pressure fuel injection system) is drawn to the engine crank house. From the crank house, the mixture is carried through one or several scavenging passages 14 up to the engine combustion chamber 41. The chamber is provided with a spark plug igniting the compressed air-fuel mixture. Exhausts 42 exit through the exhaust port 43 and through a silencer 13. All these features are entirely conventional in an internal combustion engine and for this reason will not be described herein in any closer detail. The engine has a piston 6 which by means of a connecting rod 11 is attached to a crank portion 12 equipped with a counter weight. In this manner the crank shaft is turned around. In FIG. 1 a piston 6 assumes an intermediate position wherein flow is possible both through the intake port 44, the exhaust port 43 and through the scavenging passage 14. The mouth of the intake passage 2 into the cylinder 5 is called intake port 44. Thus the intake passage is closed by the piston 6. By opening and closing the intake passage 2 varying flow speeds and pressures are created inside the passage. These variations largely affect the amount of fuel 4 supplied when the fuel supply system 8 is of carburetor type. Since a carburetor has an insignificant fuel feed pressure, the amount of its fuel feed is entirely affected by pressure changes in the intake passage 2. The subject invention makes use of these fuel amount variations in order to create simple and safe control of the amount of fuel supplied. The supplied amounts of fuel are essentially affected by the varying flow speeds and pressures inside the intake passage that are caused by the opening and the closing of the latter. And further, since the crank case in crank case scavenged two-stroke engines or crank case scavenged four-stroke engines can hold a considerable amount of fuel and consequently serve as a leveling reservoir, it is not necessary to adjust the fuel supply for each revolution, i.e. adjusting the fuel supply in one revolution will affect subsequent revolutions.

FIG. 2*a* illustrates a fuel supply system 8 of carburetor type in accordance with the invention and FIG. 2*b* is in a part enlargement of an area illustrated in FIG. 2*a* by means of dash- and dot lines. Supply of fuel 4 is affected to fuel nipple 21 on a carburetor. The carburetor is a conventional membrane carburetor and will therefore only be briefly described. Also other types of carburetors that are arranged to supply fuel in a similar manner for further treatment are possible. From the fuel nipple 21 fuel is carried to a fuel storage 22 which is delimited downwards by a membrane 23. From the storage 22 a line leads to a shut-off valve 24. The latter is in the form of a solenoid or electromagnet. Upon energization, the shut-off valve 24 closes off the interconnection between the storage 22 and the fuel lines 26, 25 leading to the venturi 27 in the carburetor, by forcing a closure plunger 29 forwards. The closure plunger 29 is attached to a piston rod travelling in a guide 30 and at the opposite face of the piston rod is arranged e.g. an iron core which is attracted by an energized coil so as to be moved outwards. In other words, the solenoid is of a normally open type. However, it goes without saying that it could also be of a normally closed type. In the latter case the shut-off valve 24 opens up the fuel passage as the solenoid is energized. The smaller channel 25 leads to the venturi 27 and is used as a so called idling nozzle whereas the coarser channel 26 also leads to the venturi 27 and is used as the principal nozzle. The throttle valve 28 is normally when operated either fully opened, i.e. "full throttle", or closed, i.e. "zero throttle". When closed the fuel supply is drawn from the idling nozzle and when open fuel supply is drawn from both the idling nozzle and the principal nozzle, however the fuel supply from the principal nozzle is substantially larger and the idling nozzle hardly affects the fuel supply during full throttle. An engine control unit 9 controls the shut-off valve 24 to be opened or closed, thereby controlling the fuel supply of the engine 1. According to the invention the control of the shut-off valve 24 may very well be different when on "full throttle" compared to "zero throttle", i.e. the throttle position may not only affect the air flow through the venturi 27 and which nozzle(s) to be used, but may also provide inputs to the control unit 9 on how and when the shut-off valve 24 should be opened or closed. The control unit 9 receives input parameters such as throttle position TP from the throttle positions sensor(s) TPS, engine speed N from the engine speed sensor(s) ESS, and optionally a temperature T from a temperature sensor(s) TS. Of course further sensor inputs could be used. According to the invention the control unit 9 uses these inputs to determine a fuel valve control sequence $N_s$/PL controlling the amount of supplied fuel to the engine 1.

The engine of FIG. 1 and the fuel supply system 8 of FIG. 2*a* and FIG. 2*b* are known in the prior art and are incorporated in the description in order to clarify the invention.

The fundamental principle of the control method of the invention is to control the fuel supply to a crankcase scavenged engine 1 by shutting-off the entire fuel supply during a number of evenly distributed revolutions, utilizing the leveling characteristic of the crank case, the number $N_s$ of fuel shut-offs determining how much fuel is supplied to the engine. This control is performed in consecutive periods of revolutions each period having a fuel valve control sequence $N_s$/PL determining the number $N_s$ of shut-offs for that particular period. Each period having a period length PL. A first period is followed by a second period, which is followed by a third period and so on; each period having a corresponding fuel valve control sequence $N_s$/PL. Preferably, when performing the fuel shut-offs, the shut-off valve 24 is closed as the intake passage 2 is open. By shutting-off the fuel supply completely for an engine revolution the requirements of the shut-off valve are reduced, i.e. compared to the precision control by displacing the flanks of the shut-off valve shut-off curve. Preferably the opening and closing of the shut-off valve can be executed while the intake passage is closed, However, the leveling characteristic of the crank case of course has its limits and, therefore, in order for the engine to work optimal it is an advantage to distribute the shut-offs evenly during the period of revolutions. Further, shutting-off the fuel supply completely for two or more consecutive engine revolutions is normally undesirable, since it may cause a sudden increase or decrease of the engine speed which is unsatisfactory during normal operation; however this effect can be used to test if the engine has a desired A/F ratio as described in EP 0 715 686 B1. Thus for normal operation of the engine, the largest satisfactory fuel reduction, when the fuel supply is completely shut-off during a revolution, is to shut-off fuel supply at every other revolution providing fuel reduction of 50%.

FIG. 3 is a table showing a fuel shut-off schedule for the fuel control of a crankcase scavenged engine 1. The fuel supply of the engine 1 is controlled in consecutive periods, each period having a period length PL of 32 revolutions. A fuel valve control sequence $N_s$/PL, where $N_s$ is the number of fuel shut-offs during the period and PL is the period length, determines which revolutions the fuel will be shut-off, by providing corresponding fuel shut-off positions FC1, . . . , FCN. The leftmost row represents the fuel valve control sequence 16/32. This means that the fuel supply is fully shut-off for 16 revolutions of the 32 revolutions in the period, i.e. a 50% fuel reduction in relation to a period utilizing the fuel valve control sequence 0/32, which has no fuel shut-offs during the period. From the left hand of the table consecutive sequences increases from the fuel valve control sequence 16/32 till the rightmost fuel valve control sequence 0/32, i.e. maximum fuel supply. Looking at the fuel valve control sequence 7/32 it can be seen that the corresponding fuel shut-offs are scheduled to be affected at the fuel shut-off positions FC1=1, FC2=6, FC3=10, FC4=15, FC5=19, FC6=24 and FC7=28. Thus the fuel supply will be shut-off at seven evenly distributed revolutions during the period and providing a fuel supply of 78% of the maximum fuel supply.

An easy way to achieve evenly distributed shut-offs during a period of revolutions can be done by calculating the fuel shut-off positions as; $FCn=(n-1)*(PL-N_s)/N_s+n$, for $n=1 \ldots N_s$, rounding off the result to nearest integer. Where PL is the period length and $N_s$ is the number of shut-offs during the period. I.e. the fuel valve control sequence $N_s$/PL provides the corresponding fuel shut-off positions [FC1, FC2, . . . , $FCN_s$]. E.g. if the period length PL is 64 and the fuel valve control sequence is 6/64, i.e. a 9% decrease of fuel in relation to the maximum available fuel supply, the first fuel shut-off is done at the first revolution in the period, since FC1=1, the second fuel shut-off is done at the period position FC2=1*(64−6)/6+2=12, the third fuel shut-off is done at period position FC3=2*(64−6)/6+3=22, the forth fuel shut-off is done at the period position FC4=3*(64−6)/6+4=33, the fifth fuel shut-off is done at the period position FC5=4*(64−6)/6+5=44 and the sixth fuel shut-off is done at the period position FC6=5*(64−6)/6+6=54. The table of FIG. 3 has been created using the above explained algorithm. Of course it is realized that this particular algorithm is merely an example on how the shut-offs can be evenly distributed.

Figure 4:
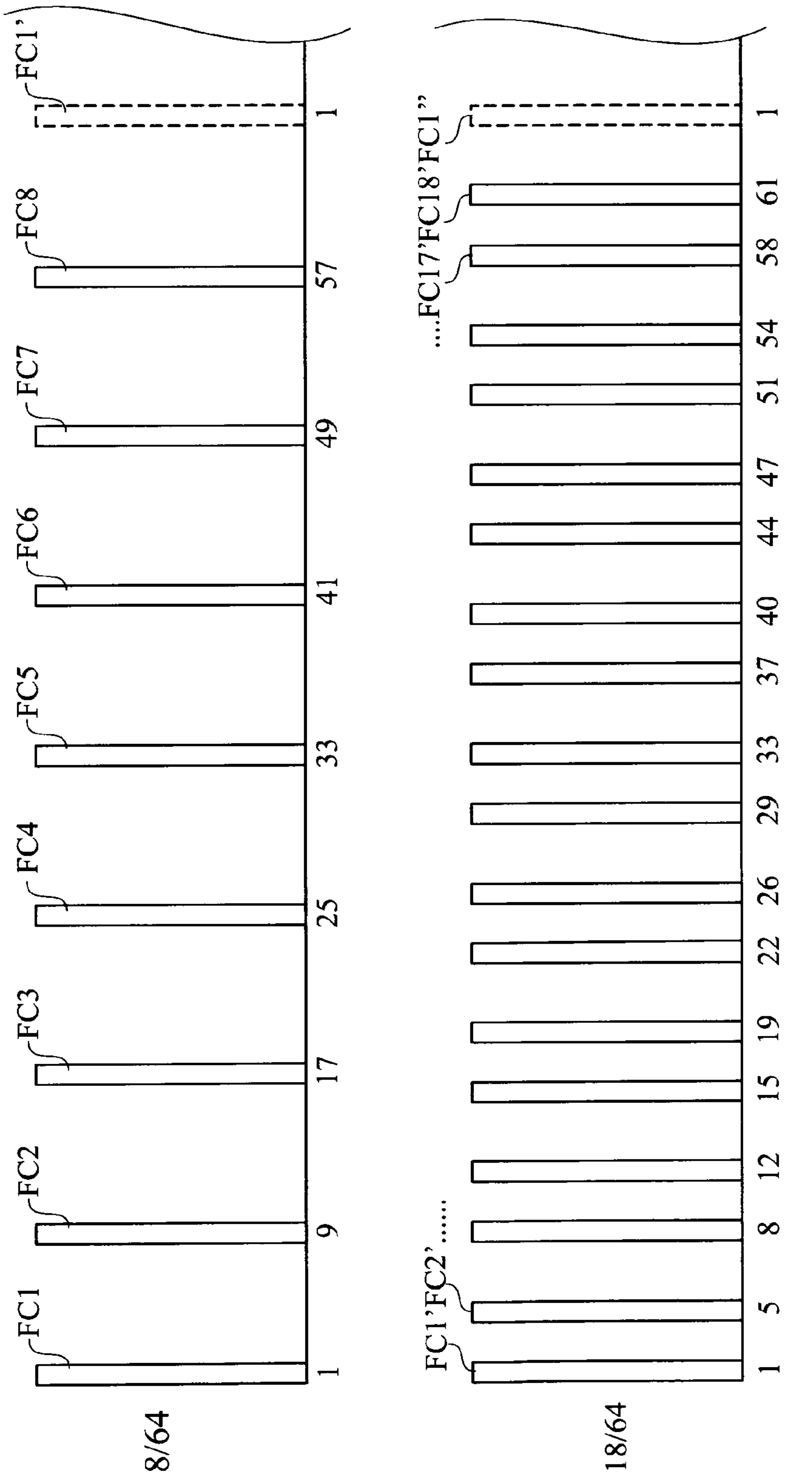
FIG. 4 shows a number of fuel shut-off positions for two periods of revolutions, each having a period length PL of 64 revolutions, i.e. a 64-period system.

FIG. 4 shows a number of fuel shut-off positions FCn for two periods of revolutions, each having a period length PL of 64 revolutions, i.e. a 64-period system. The fuel shut-off positions FCn are determined by a fuel valve control sequence $N_s$/64 determining which particular revolutions for each period the fuel supply will be shut-off. Preferably the shut-offs are arranged to shut-off all fuel supply during these particular revolutions, i.e. the shut-off valve 24 is arranged to close well before the intake passage opens and to open again after the closing of the intake passage 2, of course in time before the intake passage 2 opens again in the following revolution. According to the figure the upper shown period of revolutions has the fuel valve control sequence 8/64, providing a fuel reduction of 12.5% in relation to a period with no fuel shut-offs. The shut-offs are evenly distributed during the period providing the fuel shut-off positions FC1=1, FC2=9, FC3=17, FC4=25, FC5=33, FC6=41, FC7=49 and FC8=57 for which corresponding revolutions the fuel is fully shut-off during the period. As can be seen a new period is followed indicated by the dotted shut-off. In the lower shown period the fuel valve control sequence has changed to 18/64, i.e. a fuel supply decrease of 15.6 percentages units in relation to the upper period, i.e. a fuel reduction of 28.1% in relation to a period with no fuel shut-offs. The shut-offs of the lower following period are evenly distributed providing the fuel shut-off positions FC1'=1, FC2'=5, FC3'=8, FC4'=12, . . . , FC17'=58 and FC18'=61 for which corresponding revolutions the fuel is fully shut-off during the period.

Figure 5:
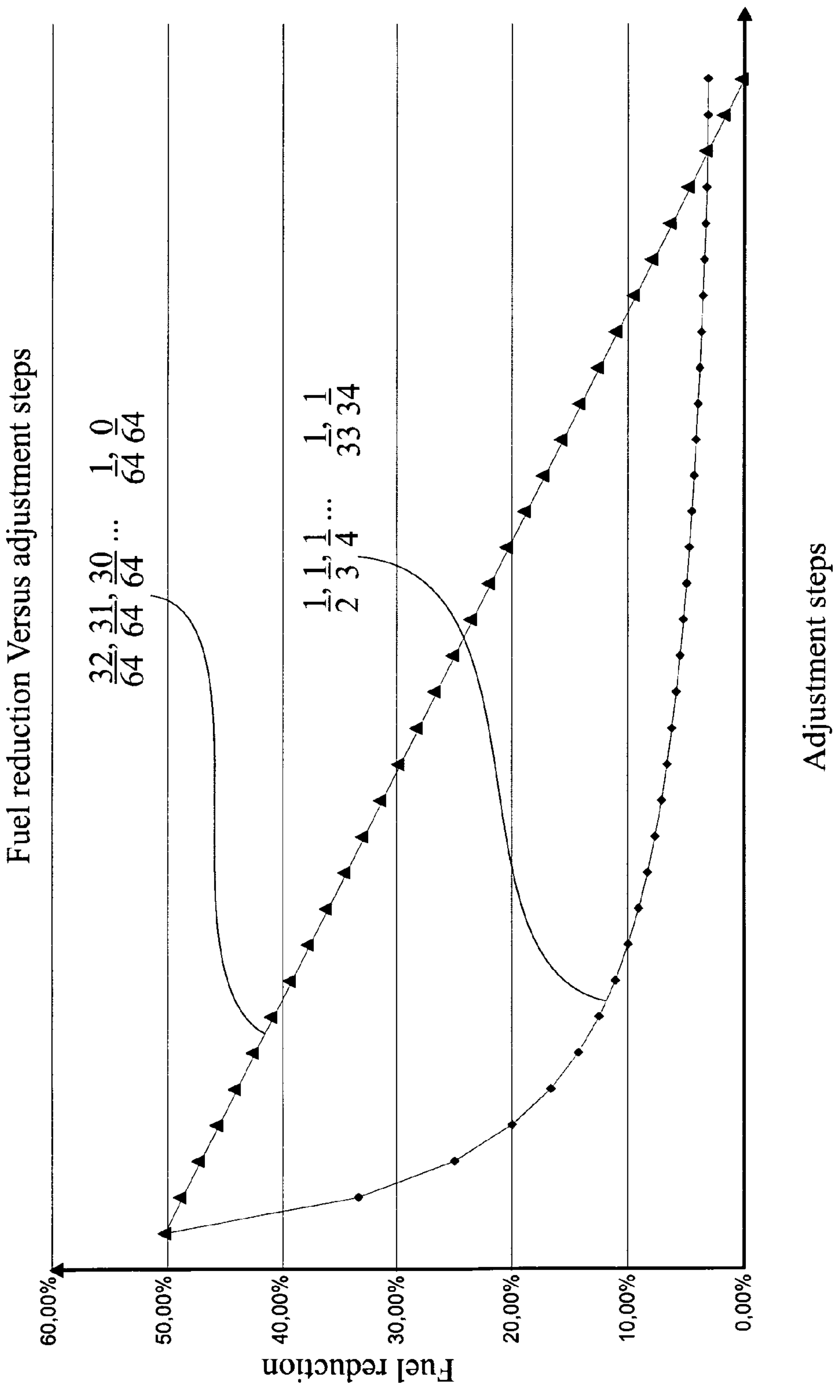
FIG. 5 illustrates the difference by utilizing a fuel control sequences according to the invention in contrast to a more rough regulation.

FIG. 5 illustrates the difference by utilizing a fuel control sequences according to the invention, e.g. 32/64, 31/64, . . . , 0/64 in contrast to the control sequences 1/2, 1/3, 1/4 . . . , where fuel is shut-off every second revolution, every third and so on. As is evident from the figure the fuel shut-off sequences $N_s$/PL of the invention provides for small and evenly sized fuel reduction steps. By increasing the period length the fuel reduction steps gets finer. In practice too sparsely distributed fuel shut-offs are undesirable, since the leveling reservoir of the crank case has it limits. This is easy solved by limiting the control region, e.g. not using the fuel control sequences 2/64, 1/64. But of course, since the engine will function using these control sequences it is not necessary to limit the control region accordingly; rather by arranging the normal fuel supply to correspond to a fuel valve control sequence $N_s$/PL somewhere between the fuel valve control sequence 32/64 and 0/64, the border regions of the fuel valve control sequence will sparsely be used. This also yields for the possible situation when the number of shut-off could exceed half the period length PL, i.e. in this particular example $N_s$>32 shut-offs. Thus these extremes are either limited in the engine control software or by arranging the practical control region so that these extremes are unlikely to occur. Looking at the control method of shutting-off every second revolution, every third and so on; it can be seen that fuel reduction steps are far from evenly sized. The difference in fuel reduction between fuel shut-offs every second and every third revolution is as high as 17 percentages units and between fuel shut-offs at every third and every fourth revolution, the difference is still as high as 8 percentages units, compared to the evenly differences of 1/PL percentage units of the invention, e.g. 1.6 percentage units in this particular example of the invention. Further, having sparser distribute shut-offs than one every twentieth revolution is in practice pointless, due to limits of the leveling reservoir of the crank case. Of course zero cut-offs is a viable option.

Whereas the invention has been shown and described in connection with the preferred embodiment thereof it will be understood that many modifications, substitutions, and additions may be made which are within the intended broad scope of the following claims. From the foregoing, it can be seen that the present invention accomplishes at least one of the stated objectives.

Consider a fuel valve control sequence $N_s$/PL having $N_s$ fuel shut-offs and the period having a period length PL; the larger the period length PL is the lesser the fuel reduction/increase between Ns shut-offs and $N_s+1/N_s-1$ shut-offs. Thus a higher period length PL provides a more accurate control, however the larger the period length PL the less often the fuel valve control sequence $N_s$/PL can be adjusted and thus the amount of supplied fuel, i.e. the A/F-ratio, e.g. if the period length PL would be infinite the fuel supply would be constant. Thus it is preferred that the period length is not to short but neither to long. According to the invention the period length PL includes at least 10 revolutions, preferably at least 25 revolutions, more preferred at least 50 revolutions and even more preferred at least 100 revolutions. E.g. in a preferred embodiment a period length PL of 256 was used, but lower or higher period lengths PL could be used.

Further, consider a period length of 128 revolutions; the fuel valve control sequence 1/128 would hardly lead to an even 0.8% reduction of fuel supply over the entire period (the reduction of fuel supply is in comparison to a period with no fuel shut-offs), since the leveling reservoir of the crank case has it limits; more likely operating the engine at the fuel valve control sequence 1/128 continuously for a number of consecutive periods would lead to a full fuel supply with periodically fuel supply disturbances. This effect is of course engine dependent, depending of the characteristics of the leveling reservoir or other fuel supply leveling means. However, this problem can be minimized by slightly reducing the effective control region; for instance by using a control region between 6/128 and 64/128, i.e. by not using the fuel control sequences between 0/128 and 5/128. Of course, the sequence 0/128 could be used without any problem since zero shut-offs won't cause any leveling problems. Preferred distances between fuel shut-offs are below 20 engine revolutions to fully utilize the leveling effect of the crank case.

Even though the fuel shut-offs according to the invention has been described as a complete shut-off of fuel a single revolution, but of course it would be possible to prolong the shut-offs to include a part of the fuel supply in the following revolution, for instance by shutting-off the fuel supply for 1.5 revolutions.

Preferably the period length PL is a predetermined value, e.g. if PL=128 the fuel supply is controlled in periods of 128 revolutions. However the period could also be chosen from a set of predetermined period lengths , for instance having a first period length when the engine is idling, one second period length when the engine has working speed and a third period length when the engine is free speeding, i.e. at full throttle without work load. Further the period length could be a variable based on real time engine settings and performance preferably the engine speed.

Further, even though the fuel supply system 8 of the invention has been described in relation to a carburetor type 9, of course a fuel injection system could be used to supply fuel to the crank case.

What is claimed is:

1. A method for controlling a valve of a crank case scavenged internal combustion engine comprising:
- determining a valve control sequence, wherein the valve is controlled in consecutive periods of revolutions each having a period length of at least ten revolutions, said determination of the valve control sequence for each period comprises:
  - providing a number of valve shut-off positions, wherein said number of valve shut-off positions corresponds to an amount of fuel or air to be supplied to the engine during the corresponding period; and
  - determining which revolutions of the period that the valve is to be closed; and
- controlling said valve according to said valve control sequence to adjust the ratio of fuel to air in a combustible mixture delivered to an engine combustion chamber.

2. The method according to claim 1, wherein the period length is a fixed predetermined value.

3. The method according to claim 1, wherein the period length is a variable period length, the variable period length based on real time engine settings and engine performance.

4. The method according to claim 3, wherein the variable period length is chosen from a set of fixed predetermined values, the set comprising at least two different values.

5. The method according to claim 1, wherein the period length includes at least twenty-five revolutions.

6. The method according to claim 1, wherein the valve shut-off positions corresponding to the valve control sequence are distributed substantially evenly during the period.

7. The method according to claim 1, wherein the valve shut-off positions corresponding to the valve control sequence are distributed so that two separate valve shut-off positions are never adjacent to each other.

8. A fuel and air supply system for a crank case scavenged internal combustion engine comprising:
- a valve in fluid communication with one of a fuel feed and an air feed that is positioned in an intake passage leading to an engine; and
- a control unit operatively connected to the valve and configured to:
  - determine a valve control sequence, wherein the valve is controlled in consecutive periods of revolutions each having a period length of at least ten revolutions, said determination of the valve control sequence for each period comprises:
    - providing a number of valve shut-off positions, wherein said number of valve shut-off positions corresponds to an amount of fuel or air to be supplied to the engine during the corresponding period; and
    - determining which revolutions of the period that the valve is to be closed; and
  - control said valve according to said valve control sequence to adjust the ratio of fuel to air in a combustible mixture delivered to an engine combustion chamber.

9. A fuel and air supply system according to claim 8, wherein the fuel and air supply system comprises a carburettor.

10. A fuel and air supply system according to claim 8, wherein the fuel and air supply system comprises a fuel injection system.

11. A fuel and air supply system according to claim 8, wherein at least one of the at least one valve is a fuel valve controlling the fuel supply to the engine.

12. A fuel and air supply system according to claim 8, wherein at least one of the at least one valve is an air valve at least partly controlling the air supply to the engine.

13. A crankcase scavenged internal combustion engine comprising:
- an engine cylinder having a crank house and an engine combustion chamber interconnected by at least one scavenging passage;
- a piston positioned between the crank house and the combustion chamber;
- an intake passage positioned at a mouth of the cylinder; and
- a fuel and air supply system in communication with the intake passage, the fuel supply system having a valve operatively connected to a control unit configured to:
  - determine a valve control sequence, wherein the valve is controlled in consecutive periods of revolutions each having a period length of at least ten revolutions, said determination of the valve control sequence for each period comprises:
    - providing a number of valve shut-off positions, wherein said number of valve shut-off positions corresponds to an amount of fuel or air to be supplied to the engine during the corresponding period; and
    - determining which revolutions of the period that the valve is to be closed; and
  - control said valve according to said valve control sequence to adjust the ratio of fuel to air in a combustible mixture delivered to an engine combustion chamber.

14. A crank case scavenged internal combustion engine according to claim 13, wherein the engine is a two stroke engine.

15. A crank case scavenged internal combustion engine according to claim 13, wherein at least one of the at least one valve is a fuel valve controlling the fuel supply to the engine.

16. A crank case scavenged internal combustion engine according to claim 13, wherein at least one of the at least one valve is an air valve at least partly controlling the air supply to the engine.

* * * * *